July 19, 1932.  C. R. PATON  1,867,752
AUTOMOBILE CONSTRUCTION
Filed Nov. 28, 1930
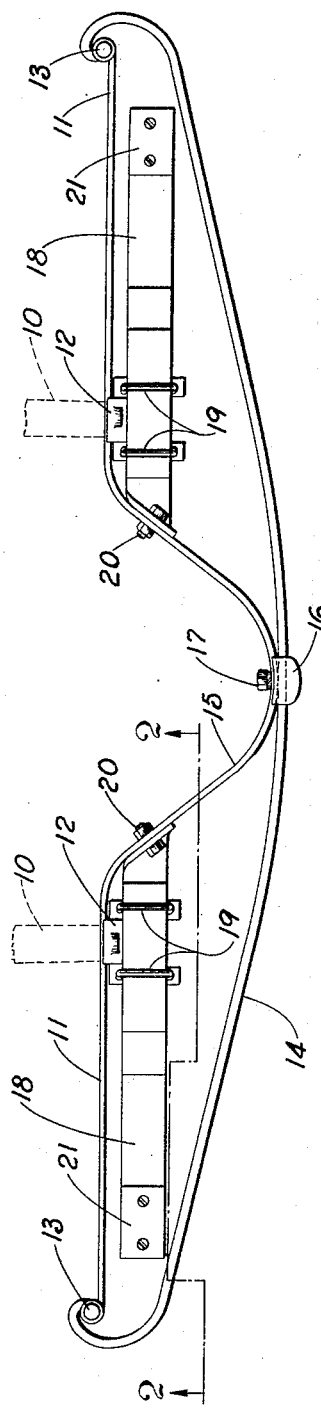
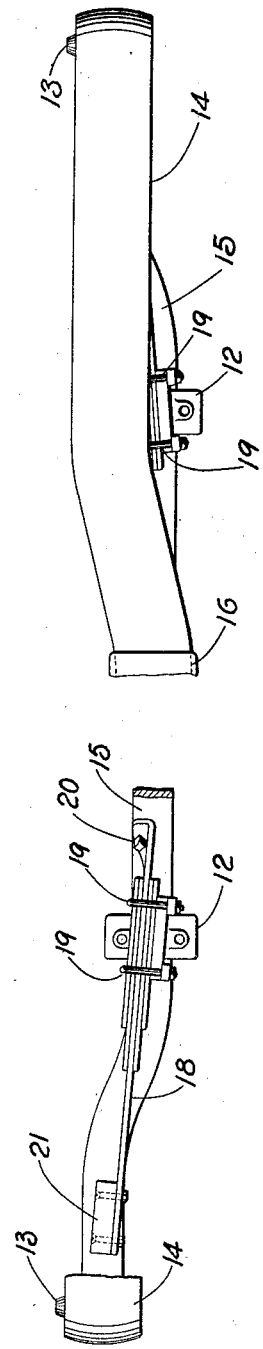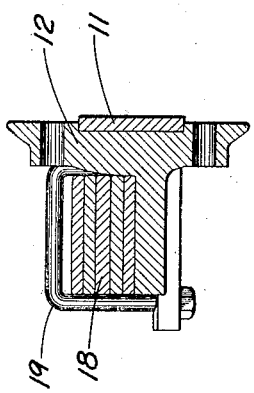
INVENTOR.
Clyde R Paton
BY P. W. Pomeroy
ATTORNEYS.

Patented July 19, 1932

1,867,752

UNITED STATES PATENT OFFICE

CLYDE R. PATON, OF BIRMINGHAM, MICHIGAN, ASSIGNOR, BY MESNE ASSIGNMENTS, TO PACKARD MOTOR CAR COMPANY, OF DETROIT, MICHIGAN, A CORPORATION OF MICHIGAN

AUTOMOBILE CONSTRUCTION

Application filed November 28, 1930. Serial No. 498,707.

This invention relates to automobile constructions and particularly to the violent vibratory movements of the parts thereof commonly known as road vibration or shimmy, the principal object being the provision of a device for developing forces in opposition to the forces tending to cause shimmy and thereby eliminating the effects thereof.

Another object is to provide a means for neutralizing or absorbing the energy tending to cause shimmy of the parts of an automobile and dissipating the same whereby the effect thereof is substantially overcome.

Another object is to provide in combination with those parts of an automobile such as the chassis and/or body subject to shimmy, a second vibratory system which is illustrated as a bumper secured to the vehicle frame having spring supported masses carried thereby for absorbing energy from the shimmying parts and dissipating or neutralizing the same to eliminate the ill effects thereof.

Another object is to provide in combination with those parts of an automobile subject to the vibratory movements known as shimmy, a second vibratory system comprising spring supported masses carried by the vehicle frame having a natural period of vibration which will take up energy from the said parts and will dissipate or neutralize the same whereby shimmying of said parts will be opposed.

Another object is to provide in combination with those parts of an automobile subject to shimmy, a spring supported mass carried by the vehicle frame having a suitable natural period of vibration mounted to be affected by said shimmy whereby the mass will absorb energy from said parts and will be caused to vibrate, means being provided for dissipating or absorbing the shimmying movement.

Another object is to provide in combination with a part of an automobile, as for example, the vehicle frame subject to shimmying movement, a spring controlled mass supported by said frame movable in respect thereto and having a natural period of vibration bearing a suitable relation to the period of vibration of the frame to the shimmy, said mass being capable by reason of the suitable relation of the periods of vibration to take up energy from said frame with suitable means provided for dissipating or absorbing this energy by frictionally resisting the motion of the mass.

The above being among the objects of the present invention, the same consists of certain features of construction and combination of parts to be hereinafter described with reference to the accompanying drawing, and then claimed, having the above and other objects in view.

In the drawing:

Fig. 1 is a top plan view of a novel bumper construction in which are incorporated various features of the invention, Fig. 2 is a view taken along section lines 2—2 of Fig. 1, Fig. 3 is a view in front elevation of the right half of the assembly shown in Fig. 1, and Fig. 4 is a detail view showing a preferred form of mounting for the leaf springs shown in Fig. 1.

Those vibratory movements of motor vehicles commonly known as road shock or shimmy have since the advent of balloon tires assumed proportions of considerable concern and although widely different theories have been advanced as to the cause of shimmy, the remedies suggested have not to my knowledge presented a satisfactory solution for curing this disturbance.

With these problems in mind, I have provided a construction which although it does not remove the cause of shimmy, removes the effect thereof to such an extent that it substantially eliminates the same and does eliminate it as far as all practical results are concerned without adding material weight to the automobile or adding to the manufacturing cost thereof. In doing this, I refer to those parts of an automobile which may include a complete chassis, the vehicle frame and/or body secured thereto whose torsional vibratory motion constitutes the shimmying movement as a primary vibrating system having a frequency of vibration proportional to the number of oscillations of those parts in a given interval of time. I then provide a second vibratory system carried by or preferably connected with the vehicle frame having a natural frequency of vibration substantially the same as or slightly less than the frequency of vibration of the primary system and having an amplitude of vibration substantially equal to or preferably greater than that of the primary system.

The result is that upon torsional vibration or shimmying of the primary system, the second system is caused to vibrate in sympathy therewith and in substantially opposite phase or dissipated with the result that the energy from the primary system. Means are provided for frictionally resisting this sympathetic vibration of the secondary system whereby such energy is absorbed, neutralized or dissipated with the result that the energy tending to cause shimmy of the primary system is absorbed, neutralized or dissipated and substantially no shimmy occurs.

Referring to the numbered parts of the drawing, in which like numerals refer to like parts throughout the several views, I have shown a vehicle frame 10 having a bumper back bar 11 secured to the front ends thereof by means of clips 12 secured to the frame by bolts or other suitable means. The bumper back bar may be of any desired shape and construction as of the conventional design and preferably has pivotally secured thereto at its ends by means of the pins 13 an impact bar 14. The back bar 11 preferably has an offset portion 15 therein adapted to contact with the impact bar 14 substantially centrally thereof and is attached thereto by means of the clip 16 and the bolt 17. A multiple leaf spring 18 is secured to each of the brackets 12 by means of the U-bolts 19, one leaf of the spring 18 also being secured to the back bar 15 by means of the bolts 20 to provide a supporting anchor for the cantilever spring 18. One leaf of the spring 18 preferably extends outwardly beyond the other leaves thereof and has a mass 21 secured adjacent to the end thereof in any desired manner.

I have found that the forces tending to cause shimmy are relatively small when the first tendency to shimmy occurs but that these forces rapidly build up to a point where the shimmy is apparent and at times build up to such proportions as to cause exceedingly violent torsional movements of the whole automobile. I have also found that if these forces are checked in their incipient stages they are prevented from building up to a point where their effect as a shimmy is apparent. For this reason, I find that the amount of energy necessary to be dissipated to prevent the forces tending to cause shimmy from building up is relatively small and that the friction between the leaves of the springs 18 need be relatively slight to obtain the necessary results. If the length of the spring leaf to which the weight 21 is attached is relatively great as shown in Fig. 2, the amplitude of vibration of the weight 21 will be much greater than the amplitude of vibration of the primary system and the energy taken up by the weights 21 from the primary system may be conveniently and expeditiously dissipated or neutralized thereby. The length and elastic properties of the spring leaf and the weight are so proportioned that the natural period of vibration of the weights 21 is approximately equal to the period of shimmy vibration of the primary system with the result that as soon as the primary system begins to shimmy, the weight 16 will begin to vibrate in sympathy therewith and in substantially opposite phase thereto due to the relations of the natural periods of vibration of the two systems and the energy causing the vibrations of the weights 21 will be taken up or absorbed from the primary system.

Having thus described my invention, I claim:

1. A bumper construction for use in motor vehicles comprising, a bumper adapted to be mounted on a vehicle and to form a part of a primary vibratory system, and means associated with the bumper adapted to vibrate in opposite phase relative to the vibrations of said primary system.

2. A bumper construction for use in motor vehicles comprising, a bumper adapted to be mounted on a vehicle and to form a part of a primary vibratory system, and means associated with the bumper adapted to vibrate in opposite phase relative to the vibrations of said primary system and having a frequency of vibration approximating that of the vibrations of the primary system.

3. A bumper construction for use in motor vehicles comprising, a bumper adapted to be mounted on a vehicle and to form a part of a primary vibratory system, and means associated with the bumper adapted to vibrate in opposite phase relative to the vibrations of said primary system and having an amplitude of vibration approximating that of the vibrations of the primary system.

4. A bumper construction for use in motor vehicles comprising, a bumper adapted to be mounted on a vehicle and to form a part of a primary vibratory system, and means associated with the bumper adapted to vibrate in opposite phase relative to the vibrations of said primary system and having a frequency and amplitude of vibration approximating respectively the frequency and amplitude of the vibrations of the primary system.

5. A bumper construction for use in motor vehicles comprising, a bumper adapted to be mounted on a vehicle and to form a part of a primary vibratory system, and means associated with the bumper adapted to vibrate in opposite phase relative to the vibrations of said primary system and having respectively a frequency approximately equal to and an amplitude slightly in excess over the frequency and amplitude of the vibrations of the primary system.

6. A bumper construction for use in motor vehicles comprising, a bumper adapted to be mounted on a vehicle and to form a part of a primary vibratory system, and means associated with the bumper adapted to vibrate in opposite phase relative to the vibrations of said primary system and having respectively a frequency somewhat less than and an amplitude somewhat greater than the frequency and amplitude of the vibrations of the primary system.

7. A bumper construction for use in motor vehicles comprising a bumper adapted to be mounted on a vehicle and to form a part of a primary vibratory system, and having mounted thereon a cantilever weighted at its free end and adapted to set up vibrations opposing the vibrations of the primary system.

8. A bumper construction for use in motor vehicles comprising a bumper adapted to be mounted on a vehicle and to form a part of a primary vibratory system, and having mounted thereon at opposite sides of its central portion cantilevers weighted at their free ends and adapted to set up vibrations opposing the vibrations of the primary system.

9. A bumper construction for use in motor vehicles comprising a bumper adapted to be mounted on a vehicle and to form a part of a primary vibratory system, and having mounted thereon a cantilever spring weighted at its free end.

10. A bumper construction for use in motor vehicles comprising a bumper adapted to be mounted on a vehicle and to form a part of a primary vibratory system, and having mounted thereon at opposite sides of its center portion, cantilever springs weighted at their free ends.

11. A bumper construction for use in motor vehicles comprising a bumper adapted to be mounted on a vehicle and to form a part of a primary vibratory system, said bumper having mounted thereon a multiple leaf spring having a cantilever member weighted at its free end.

12. A bumper construction for use in motor vehicles comprising a bumper adapted to be mounted on a vehicle and to form a part of a primary vibratory system, multiple leaf springs mounted on the bumper at opposite sides of the center portion of the bumper, and having cantilever members weighted at their free ends.

13. A bumper construction for use in motor vehicles comprising a bumper adapted to be mounted on a vehicle and to form a part of a primary vibratory system, said bumper having mounted thereon a multiple leaf spring having a cantilever member weighted at its free end and so designed that the frequency and amplitude of the vibrations thereof will be of sufficient magnitude to effect a dampening of the vibrations of the primary system.

14. A bumper construction for use in motor vehicles comprising a bumper adapted to be mounted on a vehicle and to form a part of a primary vibratory system, multiple leaf springs mounted on the bumper at opposite sides of the center portion of the bumper, and having cantilever members weighted at their free ends and so designed that the frequency and amplitude of the vibrations thereof will be of sufficient magnitude to effect a dampening of the vibrations of the primary system.

15. A bumper construction for use in motor vehicles comprising a bumper formed with a back bar adapted to be mounted on a vehicle, and having means mounted thereon for dampening torsional vibration of the vehicle.

16. A bumper construction for use in motor vehicles comprising a bumper formed with a back bar adapted to be mounted on a vehicle, and having means disposed at opposite sides of its central portion for dampening torsional vibration of the vehicle.

17. A bumper construction for use in motor vehicles comprising a bumper formed with a back bar adapted to be mounted on a vehicle, and having resiliently supported means mounted thereon for dampening torsional vibration of the vehicle.

18. A bumper construction for use in motor vehicles comprising a bumper formed with a back bar adapted to be mounted on a vehicle, and having resiliently supported means disposed at opposite sides of its central portion for dampening tortional vibration of the vehicle.

19. In a motor vehicle, the combination of the frame, a bumper secured thereto including an impact bar, and a vibration damping device mounted adjacent the impact bar and concealed thereby in front view.

20. In a motor vehicle, the combination of the frame, a bumper secured thereto including an impact bar, and a vibration damping device mounted on the bumper and concealed by the impact bar in front view.

21. In a motor vehicle, the combination of the frame, a bumper secured thereto comprising separated back and impact bars, and a vibration damping device mounted between said bars.

22. In a motor vehicle, the combination of the frame, a bumper secured thereto including an impact bar, and a vibration damping device including a weight member resiliently suspended adjacent an outer end of said impact bar and in part at least concealed thereby.

23. In a motor vehicle, the combination with the frame forming a part of a primary vibratory system, of a secondary vibratory system mounted directly on the frame and comprising a resiliently supported mass adapted to dampen or neutralize the vibrations of the primary system.

Signed by me at Birmingham, Michigan, this 21st day of November, 1930.

CLYDE R. PATON.